(12) United States Patent
Fan et al.

(10) Patent No.: US 8,866,850 B1
(45) Date of Patent: Oct. 21, 2014

(54) INTERFACE FOR APPLYING A PHOTOGRAMMETRY ALGORITHM TO USER-SUPPLIED PHOTOGRAPHIC IMAGES

(75) Inventors: Zhe Fan, Boulder, CO (US); Scott Shattuck, Westminister, CO (US); Mark Limber, Boulder, CO (US); Matt Lowrie, Louisville, CO (US); Brian Gammon Brown, Longmont, CO (US); Matthew Robert Simpson, San Francisco, CA (US); Tilman Reinhardt, Woodside, CA (US)

(73) Assignee: Google Inc., Mountain View, CA (US)

( * ) Notice: Subject to any disclaimer, the term of this patent is extended or adjusted under 35 U.S.C. 154(b) by 271 days.

(21) Appl. No.: 13/418,621

(22) Filed: Mar. 13, 2012

Related U.S. Application Data

(60) Provisional application No. 61/490,488, filed on May 26, 2011.

(51) Int. Cl.
*G09G 5/00* (2006.01)

(52) U.S. Cl.
USPC ........... 345/634; 345/581; 345/619; 345/629; 345/649; 345/659; 345/440; 715/757; 715/771

(58) Field of Classification Search
None
See application file for complete search history.

(56) References Cited

U.S. PATENT DOCUMENTS 8,160,400 B2 * 4/2012 Snavely et al. ............... 382/305

\* cited by examiner

*Primary Examiner* — Antonio A Caschera
(74) *Attorney, Agent, or Firm* — Dority & Manning, P.A.

(57) ABSTRACT

Embodiments relate to selecting textures for a user-supplied photographic image in image-based three-dimensional modeling. In a first embodiment, a computer-implemented method includes a method for inputting a user-supplied photographic image that uses a photogrammetry algorithm to adjust a plurality of camera parameters for the user-supplied photographic image. In the method, a user-supplied photographic image inputted by a user is received. A set of geographic characteristics inputted by the user that correspond to a geographic location of a camera that took the user-supplied photographic image is received. A plurality of camera parameters that correspond to the geographic location of the camera that took the user-supplied photographic image is determined. The user-supplied photographic image to be texture mapped to the three-dimensional model is enabled.

12 Claims, 9 Drawing Sheets

INTERFACE FOR APPLYING A PHOTOGRAMMETRY ALGORITHM TO USER-SUPPLIED PHOTOGRAPHIC IMAGES

CROSS-REFERENCE TO RELATED APPLICATIONS

This application is a U.S. Nonprovisional Application which claims the benefit of U.S. Provisional Application No. 61/490,488 filed on May 26, 2011, which is incorporated herein by reference in its entirety.

BACKGROUND

1. Field of the Invention

This field is generally related to photogrammetry.

2. Related Art

Three-dimensional modeling tools, such as computer-aided design (CAD) tools enable users to define three-dimensional models, such as a three-dimensional model of a building. Photographic images of the building may be available from, for example, satellite, aerial, vehicle-mounted streetview and user cameras. The photographic images of the building may be texture mapped to the three-dimensional model to create a more realistic rendering of the building.

BRIEF SUMMARY

Embodiments relate to inputting user-supplied photographic images for use in image-based three-dimensional modeling. In a first embodiment, a computer-implemented method provides inputting a user-supplied photographic image that uses a photogrammetry algorithm to adjust a plurality of camera parameters for the user-supplied photographic image. A user-supplied photographic image inputted by the user is received. An icon is positioned on a map. The location of the icon on the map corresponds to a geographic location of the camera that took the user-supplied photographic image. The icon on the map is rotated to an input heading. The heading of the icon on the map corresponds to the heading of the camera that took the user-supplied photographic image. The plurality of camera parameters that corresponds to the geographic location and the heading of the icon is determined.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Embodiments relate to creating three-dimensional models from two-dimensional images, including a user supplied photographic image. A photogrammetry algorithm is used to derive the three-dimensional model from selections on the two-dimensional images. These and other embodiments are described below with reference to the accompanying drawings.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Photogrammetry with User Supplied Photos

Figure 1:
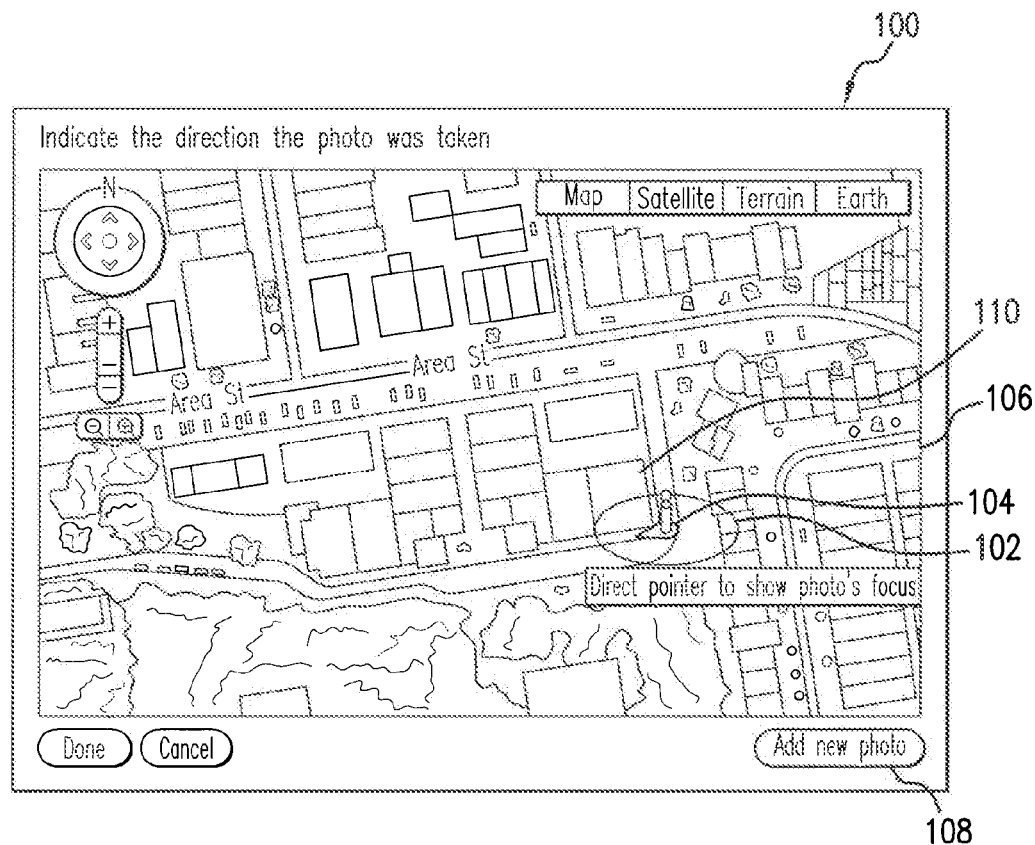
FIG. 1 is a diagram illustrating a user interface enabling the user to input a photographic image and orient it on a map, according to an embodiment.

FIG. 1 is a diagram illustrating a user interface 100 enabling the user to input a photographic image and orient it on a map. User interface 100 shows a map 106. User interface 100 further shows a pin 102 that designates a location and a direction 104. While user interface 100 shows a pin 102, a person of ordinary skill in the art would recognize that any positioning icon may be used.

A user may, for example, input a photographic image by pressing a button 108. In embodiments described in more detail below, button 108 may only be enabled once the user has specified a geometry using other types of photos (e.g., satellite or aerial photos or street-level panoramic photos) that were not supplied by a user. Once button 108 is pressed, a user may select a photo, either local to the user's client or on a remote server. In an example, the user may upload any number of user photographic images. User photographic images may include, but are not limited to, photographs taken and/or uploaded by the user. User photographic images may also include but are not limited to photographs taken by other individuals. For example, the photographs may be retrieved from image sharing websites where other users can upload the photograph to the image sharing sites.

For user-supplied photos to be used in three-dimensional modeling using photogrammetry, their associated camera parameters must be determined. In an embodiment, the camera parameters may include a position, orientation (e.g., pan, tilt, and roll), angle, focal length, prism point, and a distortion factor of each of cameras 314 and 304. As is discussed below, as the user constrains the photo to a three-dimensional geometry, the camera parameters may become more accurate. However, before photogrammetry may be used to increase the accuracy of the parameters, initial values must first be determined.

In an example, at least some of the initial camera parameters may be stored in a header of the photograph, for example, in an EXIF header of a JPEG image. For some JPEG images, the EXIF header may include the position of the camera, the camera's orientation and a focal length of a camera. In many cases, images may not have camera parameter data as header information.

In cases where accurate camera parameters are not available in an image's header, at least some of the camera parameters may be set or adjusted by moving and rotating pin 102 on user interface. In an example, pin 102 may be initially set to a two-dimensional position (e.g., a latitude and longitude) specified in an EXIF header. A user may drag pin 102 to a two-dimensional position corresponding to the location where the photograph was taken. In an example, the user may drag pin 102 precisely to the two-dimensional location where the photograph was taken. In another example, the user may drag pin 102 to a location in the line of sight of the photograph, but perhaps somewhat more distant from the subject of the photograph.

Once the user has dragged pin 102 to a two-dimensional position, the user may rotate pin 102 to specify a direction 104 of the photograph. In particular, the user may point pin 102 towards the subject of the user-supplied photo. For example, if the subject of the photo is user-supplied building 110, the user may rotate pin 102 towards the location of building 110 on map 106. Ultimately, the user may rotate pin 102 to direction 104 corresponding to a pan angle of the camera that took the photographic image. In this way, by moving and adjusting pin 102, the user may specify a two-dimensional location and direction 104 in the pan angle of the camera that took the user-supplied photograph.

While adjustment of pin 102 may set a two-dimensional location and direction 104 in the pan angle, it may not set other camera parameters. To the extent that those parameters are not available from other sources (e.g., in an EXIF header), default values may be assigned to those values. For example, while positioning pin 102 on two dimensional map 106 may enable a user to input a latitude and longitude, it may not enable a user to input an altitude. In that example, the altitude may be set to a default value. The default value may be a fixed offset from the attitude at the latitude and longitude. The fixed offset may correspond to a typical height of a camera when taking a picture.

Similarly, while positioning pin 102 on two dimensional map 106 may enable a user to input direction 104 such as a pan angle, but it may not enable a user to input a roll or tilt angle specifying the camera's orientation in three-dimensional space. In that example, the tilt may be set by default to be zero (i.e. level and parallel with the ground). Other camera parameters (e.g., focal length) may be sent by default to typical values for consumer cameras. In this way, using map positioning, EXIF headers, and default values an initial set of camera parameters may be determined.

Once the initial camera parameters for the user-supplied photo is specified, a user may constrain particular positions on the user-supplied photo to positions on a previously-defined three-dimensional model. Using the constraints, a photogrammetry algorithm may be used to further refine the camera parameters, the geometry of the three-dimensional model or both. Application of user constraints and a photogrammetry algorithm is described with respect to FIGS. 2-6.

Figure 2:
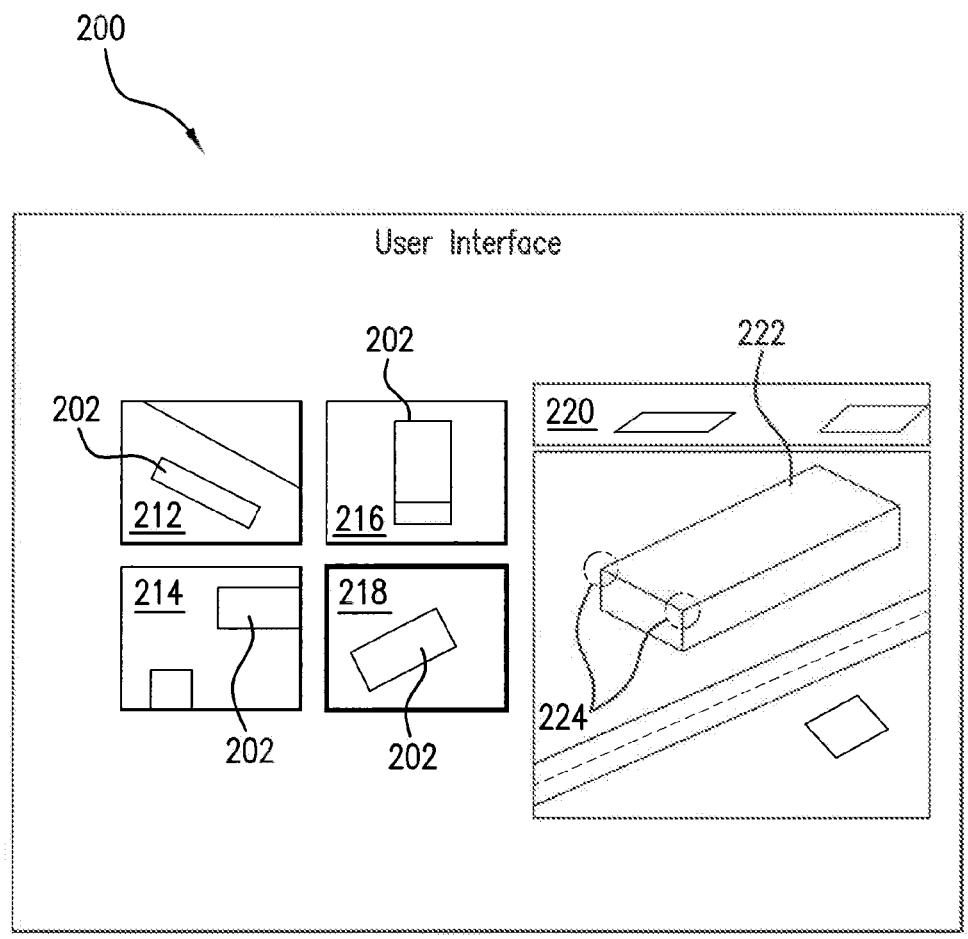
FIG. 2 is a diagram showing a user interface for creating a three-dimensional model from two-dimensional images, according to an embodiment.

FIG. 2 shows a diagram showing a user interface 200 for creating a three-dimensional model from two-dimensional images. As described below with respect to FIG. 8, user interface 200 may, in an embodiment, be a web based user interface. In the embodiment, a server may serve to a client data, such as Hypertext markup language (HTML) data, Javascript, or animation (e.g. FLASH) data, specifying user interface 200. Using that data, the client may render and display user interface 200 to a user.

User interface 200 includes images 212, 214, 216, and 218 of a building 202. Each of images 212, 214, 216, and 218 is a photographic image capturing building 202 from a different perspective. Each of images 212, 214, 216, and 218 may be an aerial or satellite image and may have an oblique or nadir perspectives. Further, one or more of images 212, 214, 216, and 218 may be a photographic image captured from street level, such as a portion of a panoramic image captured from a vehicle in motion. Each of images 212, 214, 216, and 218 may be displayed with an indication (such as a colored outline) indicating whether a user constraint has been received for the image.

Figure 3:
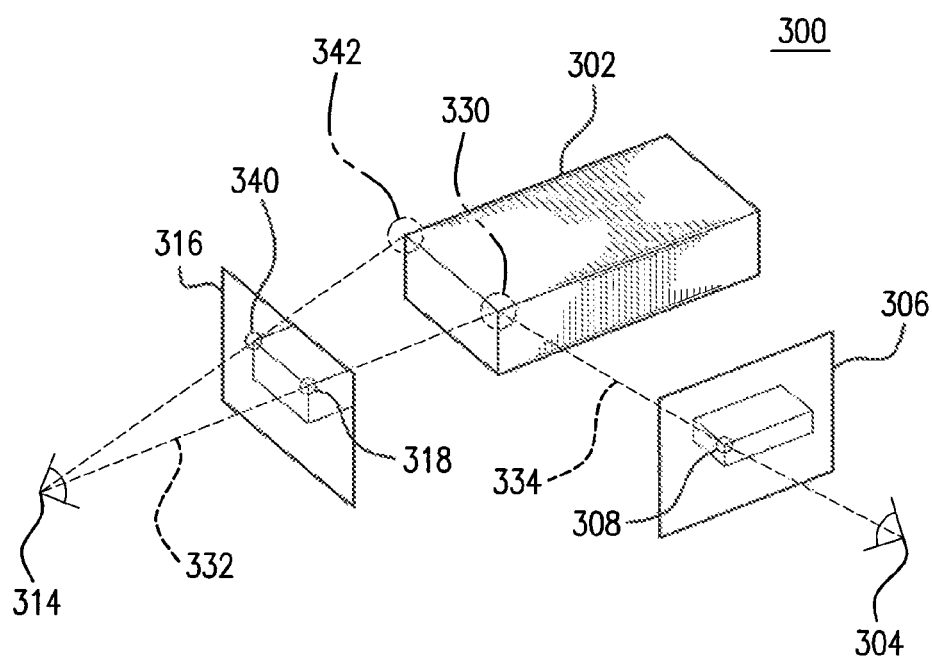
FIG. 3 is a diagram illustrating creating a three-dimensional model from user selections in two-dimensional images, according to an embodiment.

In an example, a user may select one of images 212, 214, 216, and 218 to display in a viewport 220. In viewport 220, a three-dimensional model 222 may also be displayed. Three-dimensional model 222 may be displayed, for example, as a wireframe structure so as to avoid obscuring the photographic image in viewport 220. By selecting points, such as points 224, on three-dimensional model 222, a user may constrain three-dimensional model 222 to the image in viewport 220. More specifically, a user may indicate that a position on the three-dimensional model corresponds to a position on the photographic image in viewport 220. By inputting constraints for the plurality of images 212, 214, 216, and 218, a user can specify where three-dimensional model 222 appears in each of the images. Based on the user specifications, the geometry of three-dimensional model 222 may be determined using a photogrammetry algorithm as illustrated in FIG. 3. In this way, a user may define three-dimensional model 222 to model building 202 using images of the building.

FIG. 3 shows a diagram 300 illustrating creating a three-dimensional model from user selections in two-dimensional images. Diagram 300 shows a three-dimensional model 302 and multiple photographic images 316 and 306 of a building. Images 316 and 306 were captured from cameras having different perspectives, as illustrated by camera 314 and 304. As mentioned above, a user may input constraints on images 316 and 306, such as constraints 318 and 308, and those constraints may be used to determine the geometry of three-dimensional model 302. The geometry of three-dimensional model 302 may be specified by a set of geometric parameters, representing, for example, a position of an origin point (e.g., x, y, and z coordinates), a scale (e.g., height and width), an orientation (e.g., pan, tilt, and roll). Depending on a shape of three-dimensional model 302 (e.g., box, gable, hip, pyramid, top-flat pyramid, or ramp) additional geometric parameters may be needed. For example, to specify the geometry of a gable, the angle of the gable's slopes or a position of the gable's tip may be included in the geometric parameters.

To determine the geometry of three-dimensional model 302, the user constraints from the images may be used to determine rays in three-dimensional space and the rays are used to determine the geometry. In diagram 300, a ray 332 may be determined based on user constraint 318, and a ray 334 may be determined based on a user constraint 308. Rays 332 and 334 are constructed based on parameters associated with cameras 314 and 304 respectively. For example, ray 332 may be extended from a focal point or entrance pupil of camera 314 through a point corresponding to user constraint 318 at a focal length distance from the focal point of camera 314. Similarly, ray 334 may be extended from a focal point or entrance pupil of camera 304 through a point corresponding to user constraint 308 at a focal length distance from the focal point of camera 304. Using rays 332 and 334, a position 330 on three-dimensional model 302 may be determined. This process is known as photogrammetry. In this way, the geometry of three-dimensional model 302 may be determined based on user constraints 318 and 308, and parameters representing cameras 314 and 304.

However, the parameters representing cameras 314 and 304 may not be accurate. As mentioned above, the camera parameters may include a position, orientation (e.g., pan, tilt, and roll), angle, focal length, prism point, and a distortion factor of each of cameras 314 and 304. In an example, photographic images 316 and 306 may have been taken from satellites, vehicles, or airplanes, and the camera position and orientation may not be completely accurate. Alternatively, one or both of photographic images 316 and 306 may have been taken by a user with only a general idea of where her camera was positioned when it took the photo.

In cases where the camera parameters are inaccurate, a photogrammetry algorithm may need to solve both the camera parameters representing the cameras that took the photographic images and geometric parameters representing the three-dimensional model. This may represent a large and complex non-linear optimization problem.

Locking Photogrammetry Parameters

Solving the large and complex non-linear optimization problem needed to determine a three-dimensional model from two-dimensional photographic images may be computationally intensive. The computing power needed to solve the non-linear optimization problem may slow the response time to update the three-dimensional model based on a user input. The additional computing power may be particularly problematic when the non-linear optimization is conducted within a web browser or browser plug-in. To deal with this problem, embodiments lock parameters, despite being inaccurate, to simplify the non-linear optimization problem and reduce the processing requirements. These embodiments are illustrated, for example, in FIGS. 4-6.

Figure 4:
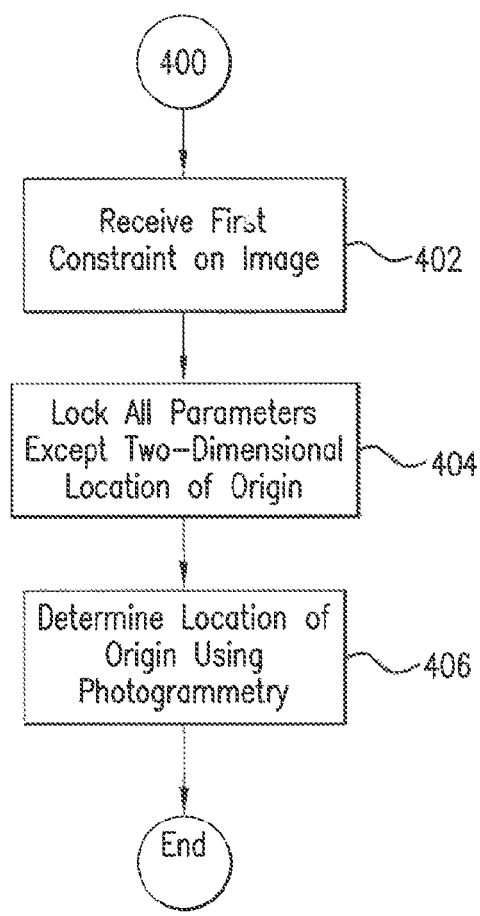
FIG. 4 is a flowchart showing a method for modifying a three-dimensional model based on a first received user constraint, according to an embodiment.

FIG. 4 is a flowchart showing a method 400 for modifying a three-dimensional model based on a first received user constraint. Prior to the start of method 400, the user may select a shape of the three-dimensional model. For example, a user may select one of several common shapes found in buildings, such as a box, gable, hip, pyramid, top-flat pyramid, or ramp. In other examples, a user may be able to define a custom shape.

When initially added, the three-dimensional model may be positioned at a default point a three-dimensional environment. In an example, the origin of the model may be set to known vertical coordinate, such as a known elevation of the ground in the three-dimensional environment, or a height of a three-dimensional model previously added to the three-dimensional model. The horizontal coordinates of the origin may be set to place the shape in the center of a photographic image in a viewport, such as a viewport 220 in FIG. 2. Other geometric parameters, such as scale and orientation, may also be set to default values.

With the new three-dimensional model added to the three-dimensional environment, a user may seek to modify it by inputting a constraint mapping a position on the three-dimensional model with a position in a two-dimensional image. For example, a user may select a corner of the model and drag it to a new position in the two-dimensional image. In method 400, a first user constraint for the three-dimensional model is received at step 402.

At step 404, all parameters—both the camera parameters and the geometric parameters are locked, except for the horizontal location of the shape. In an embodiment, the only parameters that may remain unlocked are x and y coordinates of the shape. Then, at step 406, the horizontal location of the shape is solved using photogrammetry. In this way, when a user inputs the first constraint, the shape may be translated to a new position, but its other geometric parameters, such as scale and orientation, may not change.

An example operation of method 400 is described with respect to FIG. 3. In the example, three-dimensional model 302 is initially added. Once three-dimensional model 302 is added, a user may add a first constraint 340. Constraint 340 maps a position on photographic image 316 to a position 342 on three-dimensional model 302. When the user adds constraint 340, three-dimensional model 302 is translated such that position 342 would appear as a location on photographic image 316 defined by constraint 340. Similarly, if a user moved constraint 340 on photographic image 316, three-dimensional model 302 would be translated such that position 342 follows constraint 340.

By locking all parameters except a horizontal location of origin, method 400 enables the user to position the shape without having to consider initially other aspects of the shape's geometry. To define other aspects of the shape's geometry, a user may input additional constraints as illustrated in FIG. 5A and FIG. 5B.

In an embodiment, a three-dimensional model may include a plurality of separate three-dimensional shapes (e.g., box, gable, hip, pyramid, top-flat pyramid, or ramp). Each shape may have its own set of geometric parameters. In that embodiment, method 400 may be executed when a first constraint is received mapping a position on a shape to a position on an image. In other words, method 400 may be executed once for each shape.

Figure 5A:
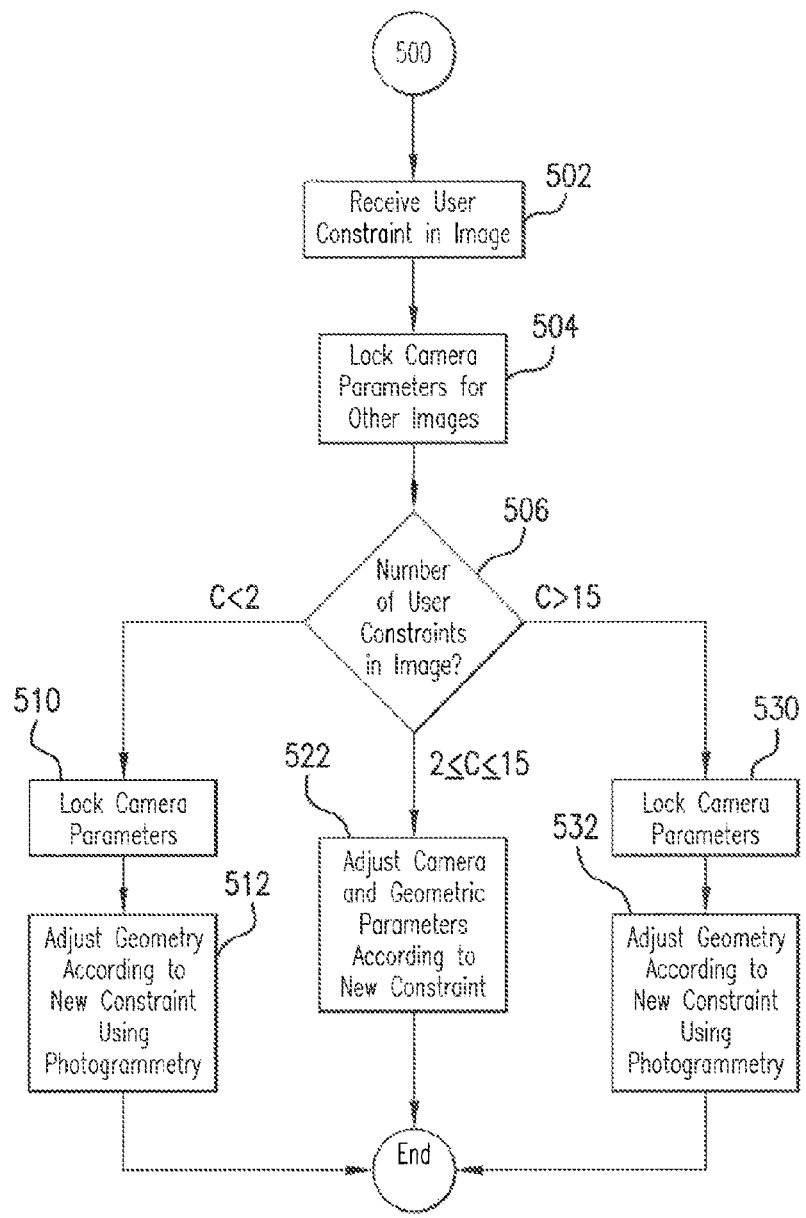
FIG. 5A is a flowchart showing a method for modifying a three-dimensional model based on a number of user constraints received for an image, according to an embodiment.
Figure 5B:
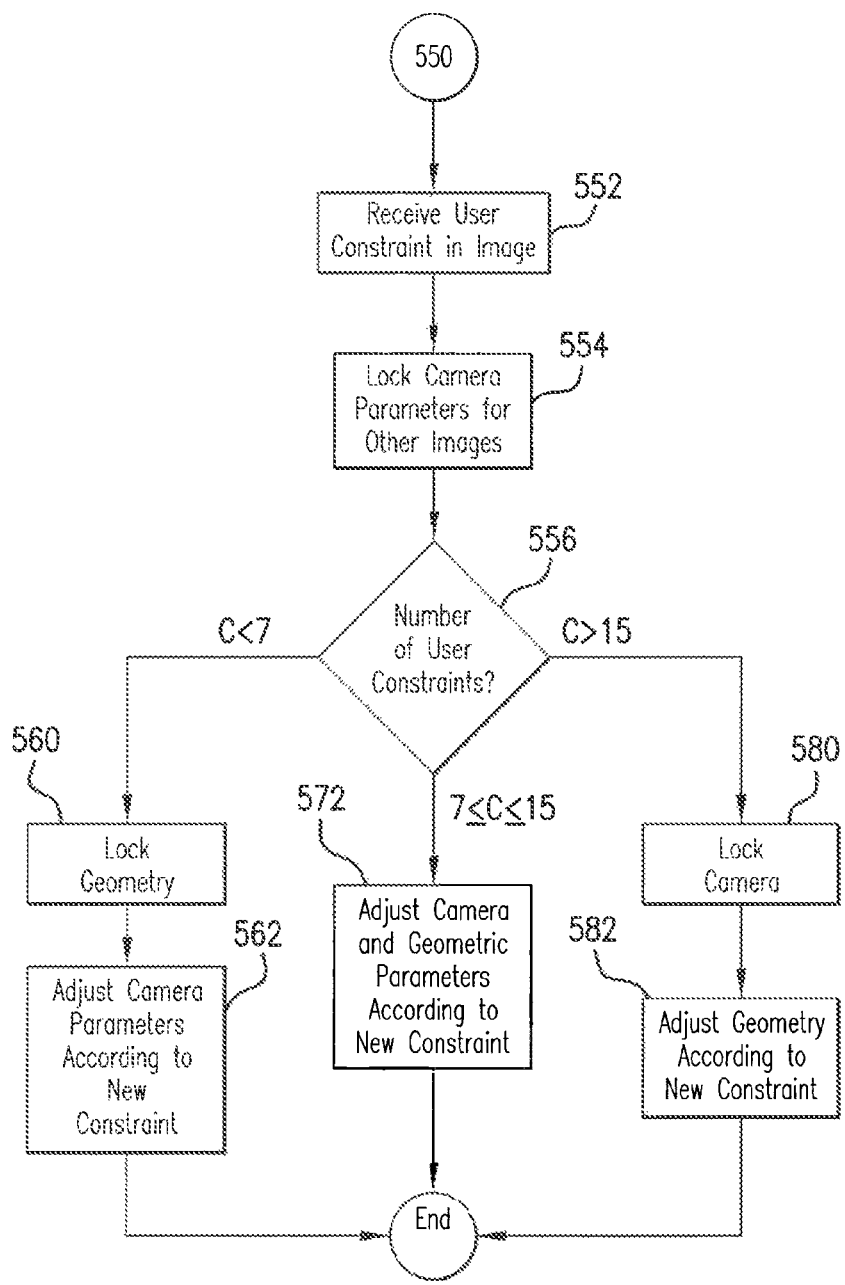
FIG. 5B is a flowchart showing another method for modifying a three-dimensional model based on a number of user constraints received for an image, according to an embodiment.

FIG. 5A is a flowchart showing a method 500 for modifying a three-dimensional model based on a number of user constraints received for an image. While method 500 may lock parameters based on a number of constraints received for a shape, method 500 may lock parameters based on a number of constraints received for an image, regardless of the number of shapes constrained to the image.

Method 500 may be used when a constraint is received for an image that corresponds to relatively accurate camera parameters. For example, aerial and satellite images have relatively accurate camera parameters as compared to street view and user images. In that example, method 500 may be used for aerial and satellite images, but not for street view and user images.

Method 500 begins at step 502 with receipt of a user constraint on an image. The constraint received in step 502 may be subsequent to the first constraint received in method 400 in FIG. 4.

Method 500 presents a number of different cases depending on how many user constraints have been received for the image. Depending on the number of constraints that have been received, different parameters may be locked. However, regardless of the number of constraints received, camera parameters are locked for every camera, except the camera that took the image constrained, at step 504.

An example operation of steps 502 and 504 is described with respect to FIG. 3. At FIG. 3, after first user constraint 340 is inputted to position three-dimensional model 302, a user inputs a second constraint 318 on image 316 taken by camera 314. Constraint 318 is received at step 502. At step 504, camera parameters, other than parameters for camera 314 that took image 316 are locked. Thus, in FIG. 3, parameters for camera 304 are locked at step 504.

While parameters for other cameras may be locked regardless of the number of user constraints, whether other parameters are locked may depend on the number of user constraints received, as illustrated at decision block 506. In an embodiment, decision block 506 may provide different operation depending on the total number of constraints received for the image constrained in step 502.

Depending on the number of constraints, decision block 406 may present different operation. If the number of constraints is less than a first threshold value (e.g., <2), camera parameters for the image constrained in step 502 may be locked at step 510. With all the camera parameters locked, non-linear optimization may be used to solve geometric parameters associated with the three-dimensional model at step 512.

Referring to FIG. 3 for an example operation of steps 510 and 512. When a user inputs constraint 318 (after previously entering constraint 340), parameters for camera 314 are locked. Non-linear optimization is used to determine the geometric parameters for three-dimensional model 302. In an embodiment, non-linear optimization is used to determine each of the geometric parameters. In this way, the user may adjust a geometry of three-dimensional model 302.

By locking the camera parameters of the image constrained in step 510, method 500 may leverage the fact that the camera parameters, while being inaccurate, are likely more accurate than the geometry of the three-dimensional model. This better accuracy may be due to the fact that the camera location is tracked electronically, whereas the geometry of the three-dimensional model is input by a user. While locking camera parameters known to be inaccurate may reduce the accuracy of the photogrammetry algorithm, it may also reduce computing requirements and increase speed.

In a further embodiment, non-linear optimization is used to determine each of the geometric parameters, except a vertical coordinate of the origin, which may be locked with the camera parameters. In this way, the vertical location three-dimensional model 302 may remain fixed, for example, to an elevation of the ground or the elevation of a previously defined three-dimensional model. In this way, a user may stack multiple three-dimensional models to represent, for example, a building.

As the user enters more constraints, the geometry of the three-dimensional model becomes increasingly accurate. After the number of user constraints is greater than or equal to the first threshold (e.g. ≥2), decision block 406 switches from locking the camera and solving the geometry to solving both the camera and the geometry. This operation is illustrated at step 522.

At step 522, neither geometric nor camera parameters may be locked. Non-linear optimization may be used to solve both camera parameters associated with the camera constrained and geometric parameters associated with the three-dimensional model. For example, non-linear optimization may be used to modify a position, orientation, focal length, prism point, and a distortion factor of the camera that took the image constrained in step 502 and parameters specifying the three-dimensional model.

As the user continues to input more constraints, the accuracy of camera parameters may be improved. However, at some point the improvement in accuracy by adjusting the camera parameters may hit a point of diminishing returns. At that point, decision block 506 may switch operation from solving both the camera and the geometry back to solving the geometry and locking the camera. This operation is illustrated at steps 530 and 532.

At step 530, when the number of constraints exceeds a second threshold (e.g., >15), the camera parameters may be locked. With the camera parameters locked, non-linear optimization may be used to solve geometric parameters associated with the three dimensional model. In this way, as the user continues to enter constraints, the geometry of the three-dimensional model may continue to adjust based on those constraints.

Switching between locking and unlocking camera parameters and (as is discussed below) geometric parameters may not be readily apparent to a user. For example, referring to FIG. 2, when a camera parameter is altered, how the photographic image is rendered into viewport 220 may not change. However, how three-dimensional model 222 is displayed in viewport 220 may change, because, for example, the camera may move relative to three-dimensional model 222. Because locking parameters as illustrated in method 500 may not be readily apparent to a user, the interface provided by method 500 may be intuitive to the user.

In addition to providing an intuitive interface, method 500 may improve processing speed. As mentioned above, using non-linear optimization to solve many different parameters may be computationally intensive. By locking some parameters (e.g., keeping them constant), the computational requirements may be reduced. While the computational requirements may be reduced, the resulting parameters may not be as accurate.

To reduce potential inaccuracies from the non-linear optimization algorithm, method 500 may use heuristics to lock parameters based on their relative accuracy. For example, because the camera parameters may initially be more accurate than geometric parameters, the camera parameters are initially locked. The camera parameters may be relatively accurate when the photographic images are taken from a camera that automatically and reliably tracks its position and orientation (and perhaps other parameters). Such cameras may include satellite, aerial, and vehicle-mounted street-level cameras.

In contrast to satellite and aerial images, camera parameters for vehicle-mounted street-level cameras and for photographic images taken and uploaded by a user may be relatively less accurate. In an example, a user may only have a rough idea where the photograph was taken and little or no data may be available for other camera parameters. An embodiment for handling user-inputted photographic images is described below with respect to FIG. 5B.

FIG. 5B is a flowchart showing a method 550 for modifying a three-dimensional model based on a number of user constraints received for an image. Method 550 may be used when a constraint is received for an image that corresponds to relatively inaccurate camera parameters. For example, method 550 may be used for street view and user images, but not for aerial and satellite images.

As with method 500, method 550 begins at step 552 with receipt of a user constraint on an image. At step 554, camera parameters, other than parameters for camera that took the image for which the constraint is received, are locked.

Depending on the number of constraints, decision block 556 may present different operation. If the number of constraints is less than a first threshold value (e.g., <7), geometric parameters for the three-dimensional model may be locked at step 560. With the geometric parameters locked, non-linear optimization may be used to solve camera parameters associated with the image constrained in step 562.

As the user enters more constraints, the camera becomes increasingly accurate. After the number of user constraints is greater than or equal to the first threshold (e.g. ≥7), decision block 556 switches from locking the geometry and solving the camera to solving both the camera and the geometry. This operation is illustrated at step 572.

At step 572, neither geometric nor camera parameters may be locked. Non-linear optimization may be used to solve both camera parameters associated with the camera constrained and geometric parameters associated with the three-dimensional model. For example, non-linear optimization may be used to modify a position, orientation, focal length, prism point, and a distortion factor of the camera that took the image constrained in step 552 and parameters specifying the three-dimensional model.

As the user continues to input more constraints, the accuracy of camera parameters may be improved. However, at some point, the improvement in accuracy by adjusting the camera parameters may hit a point of diminishing returns. At that point, decision block 506 may switch operation from solving both the camera and the geometry to locking the camera and solving the geometry. This operation is illustrated at steps 580 and 582.

At step 580, when the number of constraints exceeds a second threshold (e.g., >15), the camera parameters may be locked. With the camera parameters locked, non-linear optimization may be used to solve geometric parameters associated with the three dimensional model. In this way, as the user continues to enter constraints, the geometry of the three-dimensional model may continue to adjust based on those constraints.

By locking the geometric parameters of the three dimensional model constrained in step 560, method 550 may leverage the fact that the geometric parameters, while being inaccurate, are likely more accurate than the camera that took the image constrained at step 550. This better accuracy may be due to the fact that the geometry of the three-dimensional model has already been defined, at least in part, by a user. In an embodiment, a user may only be able to use a street view or user image after the user has already at least partly defined the three-dimensional model. This embodiment is illustrated in FIG. 6.

Figure 6:
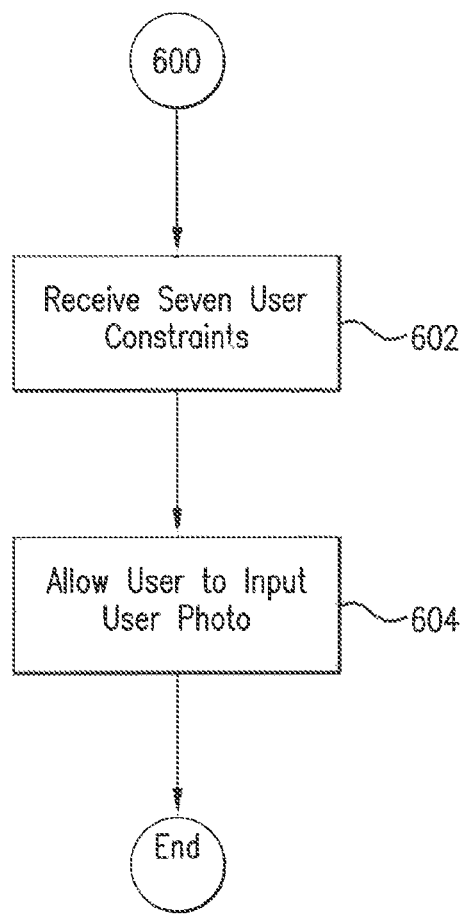
FIG. 6 is a flowchart showing a method for modifying a three-dimensional model based on a user constraint that maps a location on the three-dimensional model with a location on a photo input by a user, according to an embodiment.

FIG. 6 is a flowchart showing a method 600 for modifying a three-dimensional model based on a user constraint that maps a location on the three-dimensional model to a location on a street view image or a photographic image input by a user.

Method 600 begins at step 602 with receiving a threshold number of user constraints (e.g., seven). Only after that threshold has been satisfied is the user allowed to input a photographic image at step 604. In an example, different thresholds may be used for street view images versus a photographic image input by a user due to their relative levels of accuracy.

In this way, method 600 enables a user to input a photographic image that she may have taken with her own camera. Because camera parameters for user-inputted images are less accurate than for automatically generated images, user-inputted photographic images may be less useful for determining a geometry of a three-dimensional model than automatically generated images. However, user-inputted photographic images may be more current or may have higher resolution than other images. Further, a user may input a photographic images to capture a portion of a building that may be obscured from view for other cameras. For example, a tree may obstruct the view of a building from a road and, for that reason, street-level imagery captured from a vehicle mounted camera may not be available. In that example, a user may take an unobstructed photograph of the building from another side of the tree.

Modeling with User-Specified Photos

Figure 7:
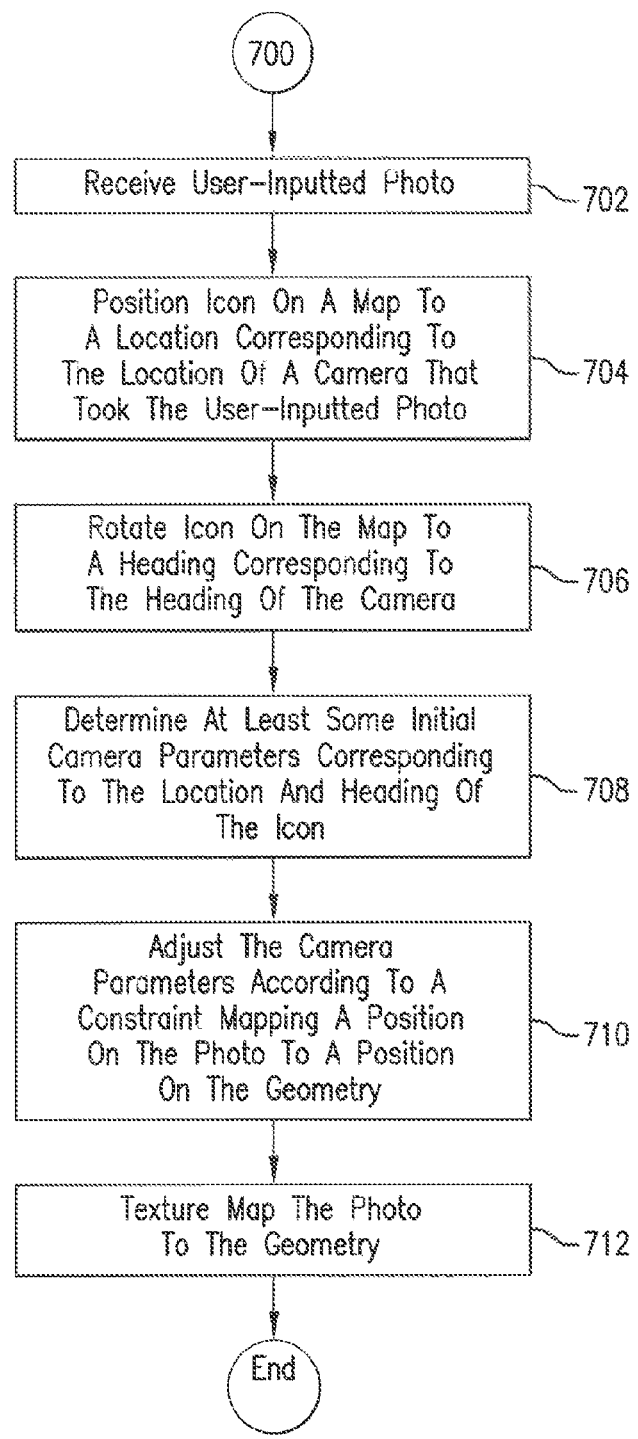
FIG. 7 is a flowchart showing a method for three-dimensional modeling a photographic image input by a user that includes geographic characteristics using the photographic image input, according to an embodiment.

FIG. 7 is a flowchart showing a method 700 for selecting a texture for a face of a three-dimensional model based on a photographic image input by a user that includes geographic characteristics for the photographic image input.

Method 700 begins at step 702 with receiving the photographic image input by a user. For example, as shown in FIG. 1, the user may add the photographic image input by pressing button 108.

At step 704, an icon is positioned on a map to a location that corresponds to the location of a camera that photographed the user-inputted photograph. For example, as shown in FIG. 1, the user may position pin 102 on map 106 to a location corresponding to the location of a camera that took the user-inputted photograph.

At step 706, the icon is rotated on the map to a heading that corresponds to the heading of the camera that photographed the user-inputted photograph. For example, as shown in FIG. 1, the user may rotate pin 102 on map 106 to a direction 104 that specifies a heading corresponding to the heading of the camera that took the user-inputted photograph.

At step 708, at least some initial camera parameters may be determined that correspond to the location and heading of the icon. For example, as shown in FIG. 1, the positioning of pin 102 by the user determines at least some of the initial camera parameters that correspond to the location and direction 104 that corresponds to the location and heading of pin 102.

At step 710, the camera parameters may be adjusted according to a constraint mapping a position on the user-inputted photograph to a position on the geometry. For example, as shown in FIG. 1 and FIG. 3, the camera parameters such as the location and direction 104 of pin 102 may be adjusted according to a constraint mapping a position on the user-inputted photograph, such as photographic image 316, to a position on the geometry of three-dimensional model 302.

At step 712, the user-inputted photograph may be texture mapped to the geometry. For example, as shown in FIG. 1 and FIG. 3, the user-inputted photograph, such as photographic image 316, may be texture mapped to the geometry of three-dimensional model 302.

System

Figure 8:
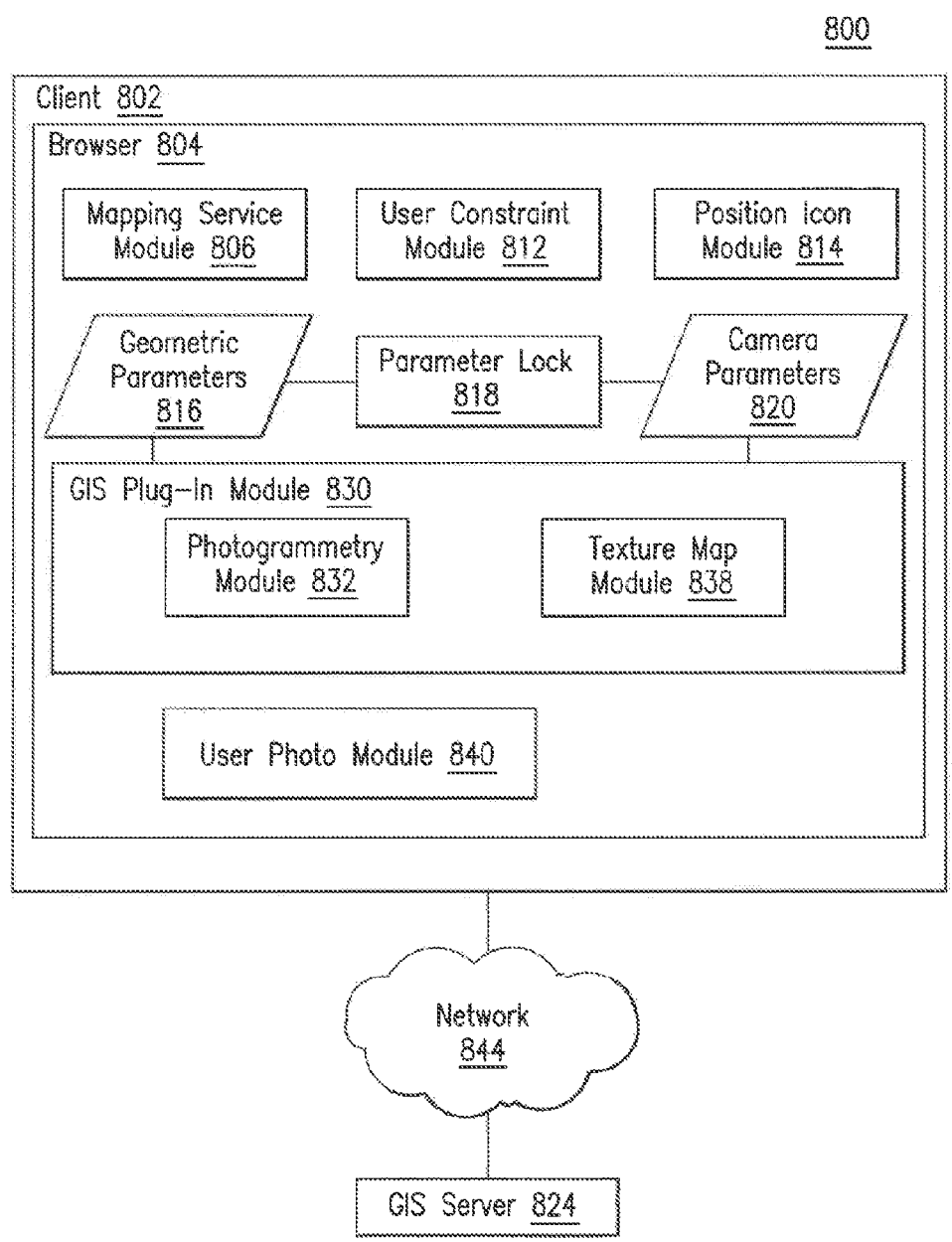
FIG. 8 is a diagram showing a system for creating a three-dimensional model from two-dimensional images, according to an embodiment.

FIG. 8 is a diagram showing a system 800 for creating a three-dimensional model from two-dimensional images. System 800 may operate as described above with respect to FIGS. 1-7. System 800 includes a client 802 coupled to a GIS server 824 via one or more networks 844, such as the Internet. Client 802 includes a browser 804. Browser 804 includes a mapping service module 806, a user constraint module 812, a position icon module 814, a parameter lock module 818, a GIS plug-in module 830, a user photo module 840, geometric parameters 816 and camera parameters 820. GIS plug-in module 830 includes a photogrammetry module 832, a texture map module 838. Each of these components is described below.

In embodiments, browser 804 may be a CHROME, FIREFOX, SAFARI, or INTERNET EXPLORER browser. The components of browser 804 may be downloaded from a server, such as a web server, and run with browser 804. For example, the components of browser 804 may be Hypertext Markup Language (HTML), JavaScript, or a plug-in, perhaps running native code. As mentioned above, mapping service module 806 is one such component. Mapping service module 806 displays a visual representation of a map, for example, as a viewport into a grid of map tiles. Mapping service module 806 is implemented using a combination of markup and scripting elements, for example, using HTML and JavaScript. A user may select the map to indicate where she would like to create a three-dimensional model.

Upon receipt of a user selection indicating a particular region at which to create a three-dimensional model, user constraint module 812 may display an interface as illustrated in examples in FIGS. 1, 8, and 9. As illustrated in those figures, the interface may display photographic images of the area. User constraint module 812 may retrieve the images from GIS server 824.

GIS server 824 may include a web server. A web server is a software component that responds to a hypertext transfer protocol (HTTP) request with an HTTP reply. The web server may serve content such as hypertext markup language (HTML), extendable markup language (XML), documents, videos, images, multimedia features, or any combination thereof. This example is strictly illustrative and does not limit the present invention.

User constraint module 812 may receive at least one constraint, input by a user, for a two-dimensional photographic images from the set of two-dimensional photographic images received from GIS server 824. Each constraint indicates that a position on the two-dimensional photographic image corresponds to a position on the three-dimensional model.

Parameter lock module 818 locks camera parameters 820 that represent cameras that took the photographic images received from GIS server 824 and geometric parameters 816 that specify a three-dimensional model. When the number of constraints by the user constraint input module for the two-dimensional photographic image is less than or equal to a first threshold value, parameter lock module 818 may lock camera parameters 820.

In an embodiment, parameter lock module 818 locks the camera parameters when the number of constraints received is greater than the second threshold value. The second threshold value may be greater than the first threshold value. In examples, the first threshold value may be 4 and the second threshold value may be 15.

In a further embodiment, parameter lock module 818 may lock camera parameters 820 for each photographic image in the set of photographic images, except a two-dimensional photographic image for which a user constraint is received by user constraint module 812.

Once parameter lock module 818 locks the appropriate parameters, photogrammetry module 832 may modify geometric parameters 816 and camera parameters 820 according to the user constraints received by user constraint module 812. Photogrammetry module 832 may determine new values for any unlocked geometric parameters 816 and camera parameters 820. Locking the camera or geometric parameters enables efficient execution of the photogrammetry algorithm. Parameter lock module 818 may operate as described above with respect to FIGS. 5A-B.

In this way, parameter lock module 818 helps to determine geometric parameters 816 representing a three-dimensional model and camera parameters 820 representing cameras. Geometric parameters 816 and camera parameters 820 may be used to texture map the photographic images received from GIS server 824 to the three-dimensional model.

System 800 further includes a user photo module 840 that enables a user to input a user photo to use in modeling and texturing. In an embodiment, when the number of constraints received by the user constraint module exceeds a threshold value (e.g. 7), user photo module enables a user to input a user photographic image.

System 800 also includes position icon module 814 that enables a user to input camera parameters for a user-inputted photograph. In an embodiment, position icon module 814 enables the user to specify the location of where the user-inputted photograph was taken and/or the direction that the camera was facing when the user-inputted photograph was taken. Position icon module 814 enables the user to input the location and the direction by providing a pin that may be maneuvered by the user in the map. The user may drag the pin precisely to the two-dimensional location where the user-inputted photograph was taken. Position icon module 814 also enables the user to adjust pin 102 so that pin 102 faces precisely the direction that the camera that took user-inputted photograph was facing. The camera parameters received by position icon module 814 helps parameter lock module 818 to determine geometric parameters 816 representing a three-dimensional model and camera parameters 820 representing cameras.

Each of client 802 and GIS server 824 may be implemented on any computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Each of browser 804, mapping service module 806, user constraint module 812, parameter lock module 818, GIS plug-in module 830, photogrammetry module 832, texture map module 838, user photo module 840, and position icon module 814 may be implemented in hardware, software, firmware, or any combination thereof.

Each of geometric parameters 816 and camera parameters 820 may be stored in any type of structured memory, including a persistent memory. In examples, each database may be implemented as a relational database.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method comprising:
    (a) receiving, by one or more computing devices, a user-supplied photographic image, inputted by a user, wherein each of the one or more computing devices comprises one or more processors;
    (b) receiving, by one or more computing devices, a first input, specified by the user, the first input specifying a position of an icon on a map, wherein a location of the icon on the map corresponds to a geographic location of a camera that took the user-supplied photographic image;
    (c) receiving, by one or more computing devices, a second input, specified by the user, the second input specifying a rotation of the icon on the map to a heading, wherein the heading of the icon on the map corresponds to the heading of the camera that took the user-supplied photographic image;
    (d) determining, by one or more computing devices, with a photogrammetry algorithm, a plurality of camera parameters corresponding to the geographic location and the heading of the icon, the plurality of camera parameters comprising one or more of position, orientation, angle, focal length, prism point and distortion factor; and
    (e) adjusting, by the one or more computing devices, with the photogrammetry algorithm the plurality of camera parameters according to a constraint mapping a position on the user-supplied photographic image to a position on a geometry.

2. The method of claim 1, wherein further comprising:
    (e) enabling the user-supplied photographic image to be texture mapped to a three-dimensional model.

3. The method of claim 1, wherein further comprising:
    (e) texture mapping the user-supplied photographic image to the geometry.

4. The method of claim 3, wherein a textured geometry includes photographic images that were not inputted by the user.

5. A computing system comprising one or more processors:
    a user photo module implemented by the one or more processors that receives the user-supplied photographic image, inputted by a user;
    a position icon module implemented by the one or more processors that:
        receives a first input specified by the user, the first input specifying a position of an icon on a map, wherein a location of the icon on the map corresponds to a geographic location of a camera that took the user-supplied photographic image;
        receives a second input specified by the user, the second input specifying a rotation of the icon on the map to a heading, wherein the heading of the icon on the map corresponds to the heading of the camera that took the user-supplied photographic image;
        determines with a photogrammetry algorithm a plurality of camera parameters corresponding to the geographic location and the heading of the icon, the plurality of camera parameters comprising one or more of position, orientation, angle, focal length, prism point, and distortion factor; and
    a texture map module implemented by the one or more processors that adjusts with the photogrammetry algorithm the plurality of camera parameters according to a constraint mapping a position on the user-supplied photographic image to a position on a geometry.

6. The system of claim 5, wherein the position icon module enables the user-supplied photographic image to be texture mapped to a three-dimensional model.

7. The system of claim 5, wherein the texture map module texture maps the user-supplied photographic image to the geometry.

8. The system of claim 7, wherein a textured geometry includes photographic images that were not inputted by the user.

9. A non-transitory computer storage medium encoded with a computer program, the program comprising instructions that when executed by one or more processors cause the one or more processors to perform operations, comprising:
    receiving a user-supplied photographic image, inputted by a user;
    receiving a first input, specified by the user, the first input specifying a position of an icon on a map, wherein a location of the icon on the map corresponds to a geographic location of a camera that took the user-supplied photographic image;
    receiving a second input, specified by the user, the second input specifying a rotation of the icon on the map to a heading, wherein the heading of the icon on the map corresponds to the heading of the camera that took the user-supplied photographic image;
    determining with a photogrammetry algorithm a plurality of camera parameters corresponding to the geographic location and the heading of the icon, the plurality of camera parameters comprising one or more of position, orientation, angle, focal length, prism point, and distortion factor; and
    adjusting with the photogrammetry algorithm the plurality of camera parameters according to a constraint mapping a position on the user-supplied photographic image to a position on a geometry.

10. The computer storage medium of claim 9, wherein further comprising:
    enabling the user-supplied photographic image to be texture mapped to a three-dimensional model.

11. The computer storage medium of claim 9, wherein further comprising:
    texture mapping the user-supplied photographic image to the geometry.

12. The computer storage medium of claim 11, wherein a texture geometry includes photographic images that were not inputted by the user.

* * * * *